United States Patent [19]

Nagara et al.

[11] Patent Number: 5,177,673
[45] Date of Patent: Jan. 5, 1993

[54] ELECTROLYTE FOR DRIVING ELECTROLYTIC CAPACITORS AND CAPACITOR USING THE SAME

[75] Inventors: Hisao Nagara; Hideki Shimamoto; Keiji Mori; Noriki Ushio, all of Kyoto; Katsuji Shiono, Ootsu; Takaaki Kishi, Kyoto, all of Japan

[73] Assignees: Matsushita Electric Industrial Co., Ltd.; Sanyo Chemical Industries, Ltd., both of Japan

[21] Appl. No.: 503,604

[22] Filed: Apr. 3, 1990

[30] Foreign Application Priority Data

Apr. 4, 1989 [JP] Japan .................................. 1-85450
Apr. 18, 1989 [JP] Japan .................................. 1-98281

[51] Int. Cl.⁵ ............................................ H01G 9/00
[52] U.S. Cl. .................................... 361/527; 252/62.2
[58] Field of Search .............. 252/62.2; 361/525–527

[56] References Cited

U.S. PATENT DOCUMENTS

| | | | |
|---|---|---|---|
| 3,609,467 | 9/1971 | Curtis | 361/527 |
| 4,116,846 | 9/1978 | Sato et al. | 252/78.1 |
| 4,245,278 | 1/1981 | Finkelstein et al. | 361/527 |
| 4,473,864 | 9/1984 | Van Heusden | 361/327 |
| 4,734,821 | 3/1988 | Morimoto et al. | 361/527 |
| 4,774,011 | 9/1988 | Mori et al. | 252/62.2 |
| 4,821,153 | 4/1989 | Kuwae et al. | 252/62.2 X |

FOREIGN PATENT DOCUMENTS

| | | |
|---|---|---|
| 2238463 | 2/1974 | Fed. Rep. of Germany . |
| 59-78522 | 5/1984 | Japan . |
| 62-248217 | 10/1987 | Japan . |
| 2-62026 | 3/1990 | Japan . |

Primary Examiner—Donald A. Griffin
Attorney, Agent, or Firm—Lowe, Price, LeBlanc & Becker

[57] ABSTRACT

An electrolyte for driving electrolytic capacitors and electrolytic capacitors using the electrolyte are described. The electrolyte comprises at least one quaternary ammonium salt of aliphatic saturated dicarboxylic acid having from 6 to 10 carbon atoms in total or a quaternary ammonium salt of glutaric acid, dissolved in a solvent comprised of an aliphatic polyol. When applied to an electrolytic capacitor, the electrolyte ensures improvements in loss characteristic and high temperature characteristics with time. Thus, the capacitor has a prolonged life.

46 Claims, 2 Drawing Sheets

ELECTROLYTE FOR DRIVING ELECTROLYTIC CAPACITORS AND CAPACITOR USING THE SAME

BACKGROUND OF THE INVENTION

1. Field of the Invention

This invention relates to an electrolyte for driving electrolytic capacitors and also to capacitors using the electrolyte.

2. Description of the Prior Art

A typical known electrolyte used for driving an electrolytic capacitor is one which is obtained by dissolving ammonium adipate solute in a solvent mainly composed of ethylene glycol. This electrolyte is disadvantageous in low specific conductance and a great variation in the conductance at high temperatures.

In order to overcome the disadvantage, Japanese Laid-open Patent Application No. 59-78522 describes an electrolyte for driving electrolytic capacitor which has high specific conductance. This electrolyte is a solution of a quaternary ammonium salt of dibasic carboxylic acid of the formula, $HOOC-(CH_2)_n-COOH$, wherein $4 \leq n \leq 8$, dissolved in a mixed solvent of a dipolar organic solvent and from 2 to 10 wt % of water.

Moreover, Japanese Laid-open Patent Application No. 62-248217 describes an electrolyte for electrolytic capacitor which has high specific conductance and is stable at high temperatures. The electrolyte is made of a quaternary ammonium slat of aliphatic saturated dicarboxylic acid dissolved in a solvent mainly composed of γ-butyrolactone.

However, these electrolytes make use of solvents mainly composed of N,N-dimethylacetamide or γ-butyrolactone, which are high in vapor pressure. This leads to a high vapor pressure of the electrolyte, with the result that when such an electrolyte is used to drive capacitor, an amount of the electrolyte which passes through a sealed portion such as with rubber and evaporates to outside becomes larger than known electrolytes. This presents the problem that the actual life of the electrolytic capacitor is not improved as desired.

SUMMARY OF THE INVENTION

It is an object of the invention to provide an electrolyte for driving electrolytic capacitor which is useful in improving the loss characteristic and high temperature characteristic of the capacitor in relation to time.

It is another object of the invention to provide an electrolyte for driving electrolytic capacitor which ensures a long life of the capacitor.

It is a further object of the invention to provide an electrolytic capacitor using the electrolyte mentioned above.

The above objects can be achieved, according to one embodiment of the invention, by an electrolyte which comprises at least one compound selected from the group consisting of quaternary ammonium salts of aliphatic saturated dicarboxylic acids having from 6 to 10 carbon atoms and glutaric acid and dissolved in a solvent mainly composed of an aliphatic polyol.

According to another embodiment, there is also provided an electrolytic capacitor which comprises an element having an anode electrode and a cathode electrode which are facing each other through a separator provided between the anode electrode and the cathode electrode. The separator is impregnated with an electrolyte defined above. The element may be encased in an appropriate casing.

BRIEF DESCRIPTION OF THE DRAWINGS

FIGS. 2 to 4 are, respectively, characteristic properties at 105° C. of aluminium electrolytic capacitors having ratings of 10 V and 220 μF in relation to the variation in time for different electrolytes of the invention and for comparison wherein FIG. 2 is a graphical representation of the electrostatic capacity at the rated voltage, FIG. 3 is a graphical representation of tan δ at the rated voltage, and FIG. 4 is a graphical representation of the leakage current without application of any voltage.

DETAILED DESCRIPTION AND EMBODIMENTS OF THE INVENTION

Figure 1:
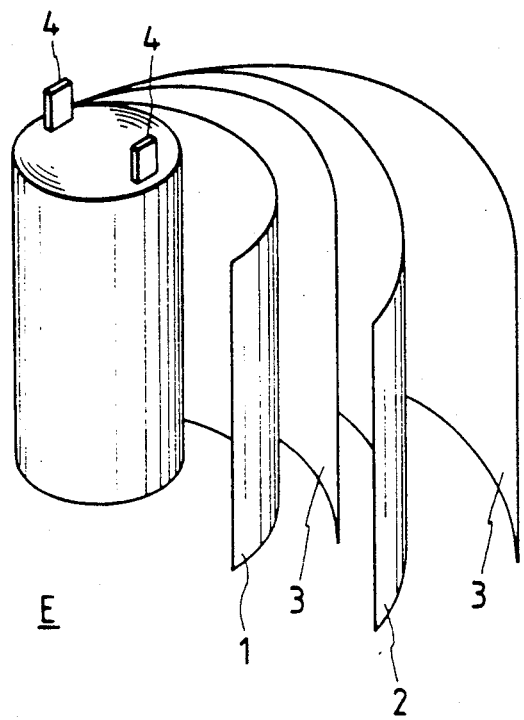
FIG. 1 is a schematic perspective view of an electrolytic capacitor element or unit according to the invention.

The electrolyte according to the invention comprises at least one quaternary ammonium salt of an aliphatic saturated dicarboxylic acid having from 6 to 10 carbon atoms or glutaric acid, which is dissolved in a solvent mainly composed of an aliphatic polyol.

The polyols used as the solvent include: (1) saturated or unsaturated aliphatic polyols such as, for example, ethylene glycol, propylene glycol, 2,3-butanediol, pinacol, 1,2-hexanediol, 1,2-decanediol, 1,2-dodecanediol, glycerine, 1,2,4-trihydroxybutane, 1,2,3-heptanetriol, 1,2,6-trihydroxyhexane, 1,2,3,4-tetrahydroxybutane, 1,2,7,8-octanetetrol, 5-hexen-1,2-diol, 7-octen-1,2-diol, ditrimethylene glycol, 1,3-butanediol, 1,4-butanediol, 2,4-pentanediol, 1,5-pentanediol, neopentyl glycol, 1,6-hexanediol, 2,5-hexanediol, 2-methyl-1,3-pentanediol, hexylene glycol, 2,2-dimethylolbutane, 2,4-heptanediol, 2-ethyl-1,3-hexanediol, ethohexadiol, 2-ethyl-2-n-butyl-1,3-propanediol, cis-2-buten-1,4-diol, trans-2-buten-1,4-diol, 2-butyn-1,4-diol, dimethylhexindiol, trimethylolpropane, pentaerythritol and the like; and (2) ether group-containing polyols including (2)-1alkoxyalkane polyols such as, for example, 3-methoxy-1,2-propanediol, 3-ethoxy-1,2-propanediol, 3-propoxy-1,2-propanediol, 3-butoxy-1,2-propanediol, 3-phenylmethoxy-1,2-propanediol, 3-cyclohexyloxy-1,2-propanediol, diglycerine and the like, and (2)-2 polyalkylene polyols such as, for example, diethylene glycol, triethylene glycol, tetraethylene glycol, dipropylene glycol, tripropylene glycol, tetrapropylene glycol, polyethylene glycol, polypropylene glycol, polybutylene glycol and copolymers thereof, and polyoxyalkylene polyols described, for example, in U.S. Pat. No. 4,116,846. Of these, ethylene glycol is preferred as the saturated or unsaturated polyol, 3-methoxy-1,2-propanediol as the alkoxyalkane polyol, and diethylene glycol as the polyalkylene polyol. Most preferably, ethylene glycol is used.

The aliphatic polyol may be used as the solvent singly or in combination with other solvents provided that the aliphatic polyol should be used in amounts not less than 50 wt %, preferably not less than 70 wt %, and more preferably not less than 80 wt % of the combination. The reason why the content of the polyol is defined as not less than 50 wt % is that when the content is less than 50 wt %, the resultant electrolyte becomes poorer with respect to the transmission through a sealant at high temperatures and the variation in specific conductance.

Examples of the solvents other than the aliphatic polyol include: alcohols including monohydric alcohols such as methyl alcohol, ethyl alcohol, propyl alcohol, butyl alcohol, diacetone alcohol, benzyl alcohol, amino alcohol and the like; ethers including monoethers such as ethylene glycol monomethyl ether, ethylene glycol monoethyl ether, diethylene glycol monomethyl ether, diethylene glycol monoethyl ether, ethylene glycol phenyl ether and the like, and diethers such as ethylene glycol dimethyl ether, ethylene glycol diethyl ether, diethylene glycol dimethyl ether, diethylene glycol diethyl ether and the like; amides including formamides such as N-methylformamide, N,N-dimethylformamide, N-ethylformamide, N,N-diethylformamide and the like, acetamides such as N-methylacetamide, N,N-dimethylacetamide, N-ethylacetamide, N,N-diethylacetamide and the like, propionamides such as N,N-dimethylpropionamide, and hexamethylphosphorylamide; oxazolidinones such as N-methyl-2-oxazolidinone, 3,5-dimethyl-2-oxazolidinone and the like; lactones such as $\gamma$-butyrolactone, $\alpha$-acetyl-$\gamma$-butyrolactone, $\beta$-butyrolactone, $\gamma$-valerolactone, $\delta$-valerolactone and the like; nitriles such as acetonitrile, acrylonitrile and the like; dimethylsulfoxide, sulforan, 1,3-dimethyl-2-imidazolidinone, N-methylpyrrolidone, aromatic solvents such as toluene, xylene and the like, paraffin solvents such as normal paraffin, iso-paraffin and the like. These solvents may be used singly or in combination.

The solute used in the electrolyte is a quaternary ammonium salt of aliphatic saturated dicarboxylic acid having from 6 to 10 carbon atoms in total or glutaric acid.

Examples of the dicarboxylic acid include linear dicarboxylic acids such as adipic acid, pimelic acid, suberic acid, azelaic acid, sebacic acid and the like, and branched dicarboxylic acids such as 3-methyladipic acid, 3-methylglutaric acid, 2,2-dimethylsuccinic acid, 3,3-dimethylglutaric acid, diethylmaloic acid and the like. Of these, adipic acid and pimelic acid are preferred.

Examples of the quaternary ammonium salts include: tetraalkylammonium salts, whose alkyl moiety has from 1 to 12 carbon atoms, such as tetramethylammonium, tetraethylammoniu, tetrapropylammonium, tetrabutylammonium, methyltriethylammonium, dimethyldiethylammonium, ethyltrimethylammonium and the like salts; aryltrialkylammonium salts such as phenyltrimethylammonium and the like salts; cyclohexyltrialkylammonium salts such as cyclohexyltrimethylammonium and the like salts; arylalkyltrialkylammonium salts such as benzyltrimethylammonium and the like salts; and N,N-dialkylpiperidinium salts such as N,N-dimethylpiperidinium and the like salts. These may be used singly or in combination. Of these, tetraalkylammonium salts are preferred. More preferably, asymmetric tetraalkylammonium salts wherein four alkyl groups are all different from one another.

The content of the quaternary ammonium salt of the aliphatic saturated dicarboxylic acid or glutaric acid in the electrolyte of the invention is generally in the range of from 1 to 50 wt %, preferably from 5 to 40 wt %. The reason for this is that when the content is less than 1 wt %, a high specific conductance is not attained, and over 40 wt %, the solute may settle. The molar ratio of the acid and the quaternary ammonium base in the salt is in the range of from 1:2.5 to 2:1.

Although the electrolyte may contain 2 wt % or over of water, the content of water should preferably be not larger than 2 wt % of the electrolyte.

The electrolyte of the invention exhibits high specific conductance and stability at high temperatures. The electrolytic capacitor using the electrolyte is low in impedance and stable at high temperatures. This is because the solvent used is mainly composed of an aliphatic polyol whose vapor pressure is low and the solute is at least one compound selected from quaternary ammonium salts of aliphatic saturated dicarboxylic acids having from 6 to 10 carbon atoms in total or glutaric acid. Such an electrolyte has high specific conductance and a reduced amount of transmission through sealant or sealing material at high temperatures when applied to an electrolytic capacitor. The variation in the specific conductive also becomes small.

When the content of water in the electrolyte is suppressed to a level of not larger than 2 wt % of the electrolyte of the invention, formation of an aluminium hydrate through reaction between the electrode and water at high temperatures of 125° C. or over can be suppressed along with the generation of gases accompanied by the reaction. As a result, the electrolyte and the electrolytic capacitor can be used at high temperatures of 125° C. or over.

The electrolytic capacitor should comprise an anode electrode and a cathode electrode which are in face-to-face relation with each other through a separator. The separator is impregnated with the electrolyte set forth before. A typical capacitor is shown in FIG. 1, which generally includes a capacitor element E. The element E has an anode foil 1 and a cathode foil 2 between which a separator 3 is provided. These foils and the separator are convolutely wound as shown. The anode foil 1 and the cathode foil 2 have, respectively, leads 4. The separator of this element is impregnated in the electrolyte according to the invention and the element is encased in an appropriate case such as of aluminium to complete an electrolytic capacitor.

The present invention is more particularly described by way of examples.

Examples 1 to 4 and Comparative Examples 1 and 2

Electrolytes having compositions indicated in Table 1 were prepared and subjected to measurement of specific conductance at normal temperatures. The results are shown in the table.

TABLE 1

| | Electrolytic Composition (parts by weight) | | Content of Water (%) | Specific Conductance at 30° C. (mS/cm) |
|---|---|---|---|---|
| Comp. Ex. 1 | ethylene glycol diammonium adipate | 90 10 | 1.3 | 4.1 |
| Comp. Ex. 2 | $\gamma$-butyrolactone monotetraethylammonium adipate | 80 20 | 0.8 | 5.3 |
| Example 1 | ethylene glycol water monotetraethylammonium pimelate | 75 5 20 | 5.3 | 4.8 |
| Example 2 | ethylene gycol water di-methyltriethylammonium adipate | 67 3 30 | 3.1 | 5.2 |
| Example 3 | ethylene glycol di-methyltriethylammonium adipate | 70 30 | 0.9 | 5.0 |
| Example 4 | ethylene glycol monotetramethylammonium glutarate | 80 20 | 0.8 | 4.5 |

These electrolytes were used to make electrolytic capacitors of the type as shown in FIG. 1. The capacitor used was an aluminium electrolytic capacitor having ratings of 10 V and 220 μF. The capacitor had a convolutely wound unit including an anode foil 1 made of aluminium and a cathode foil 2 made of aluminium between which a separator 3 was intervened as shown in FIG. 1. The anode 1 and the cathode 2 had, respectively, leads 4 as shown. The capacitor elements were, respectively, impregnated with the electrolytes and encased in an aluminium case.

The resultant capacitors were subjected to measurements of initial electrostatic capacity, tan δ and leakage current. The results are shown in Table 2 wherein each characteristic is an average value of ten measurements.

TABLE 2

|  | Initial Electrostatic Capacity (μF) | Initial tan δ (%) | Initial leakage current (μA) |
| --- | --- | --- | --- |
| Comp. Ex. 1 | 223 | 18.5 | 2.3 |
| 2 | 217 | 16.3 | 2.8 |
| Example 1 | 222 | 17.1 | 2.5 |
| 2 | 223 | 16.5 | 2.4 |
| 3 | 221 | 16.8 | 2.4 |
| 4 | 221 | 17.5 | 2.4 |

Figure 2:
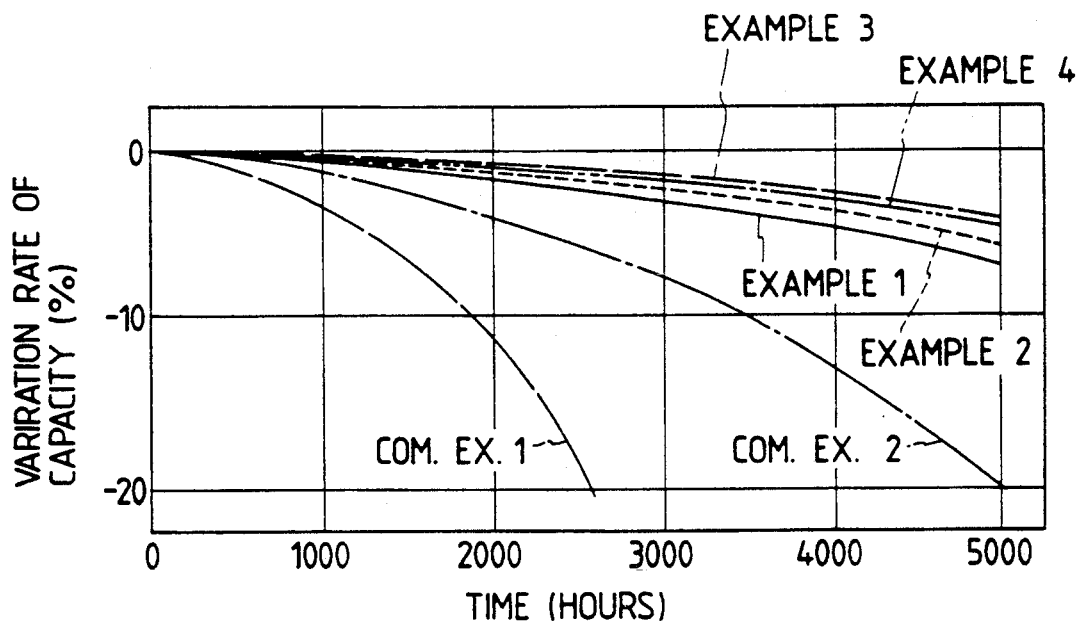
Figure 3:
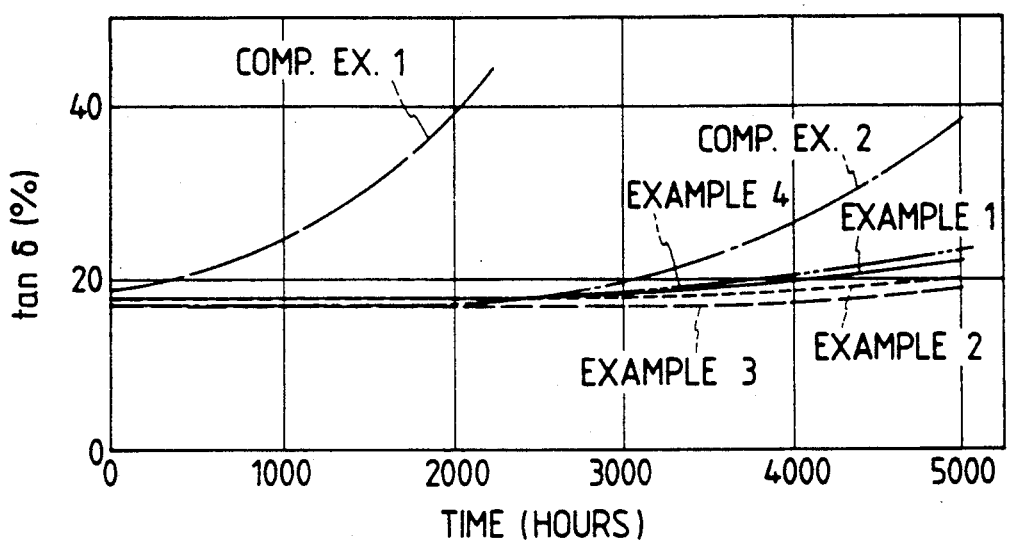
Figure 4:
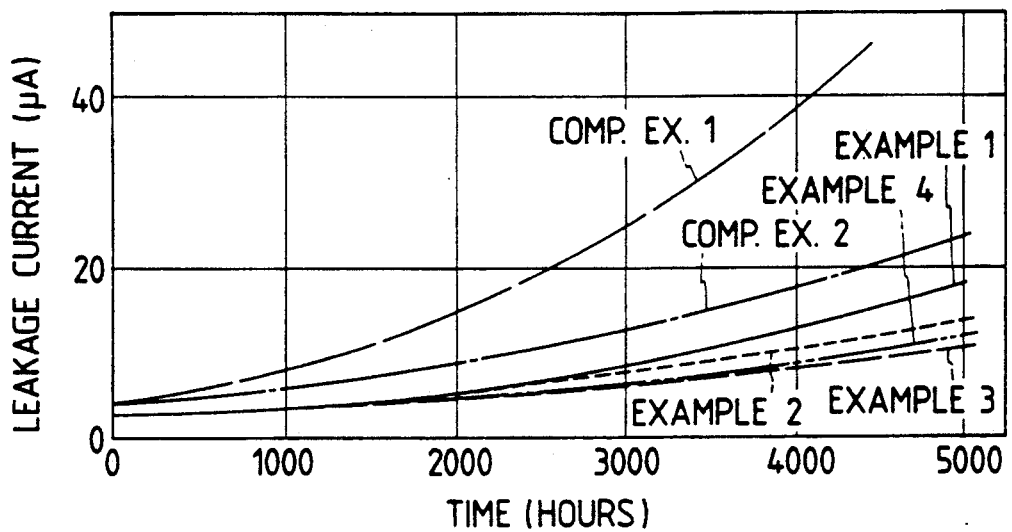

In FIGS. 2 to 4, there are shown the characteristic properties at 105° C. of the aluminium capacitors obtained in Examples 1 to 4 and Comparative Examples 1, 2 in relation to the variation in time. More particularly, FIG. 2 shows the variation in the electrostatic capacity at the rated voltage, FIG. 3 shows the variation in the tangent of loss angle at the rated voltage, and FIG. 4 shows the variation in the leakage current without application of voltage.

As will be apparent from these figures, the capacitors using the electrolytes according to the invention are very small in the characteristic variation at high temperatures with high reliability and have thus a prolonged life. When the content of water is less than 2 wt %, the characteristic variations become smaller. On the other hand, the capacitors using the known electrolytes are larger in the variations.

What is claimed is:

1. An electrolyte for driving electrolytic capacitors which comprises at least one compound selected from the group consisting of quaternary ammonium salts of aliphatic saturated dicarboxylic acids having from 6 to 10 carbon atoms and dissolved in a solvent which comprises not less than 50 wt % of an aliphatic polyol.

2. An electrolyte according to claim 1, wherein said solvent comprises not less than 50 wt % of the aliphatic polyol, based on the solvent.

3. An electrolyte according to claim 2, wherein said aliphatic polyol is ethylene glycol.

4. An electrolyte according to claim 2, wherein said aliphatic polyol is 3-methoxy-1,2-propanediol.

5. An electrolyte according to claim 2, wherein said aliphatic polyol is contained in an amount of not less than 70 wt %.

6. An electrolyte according to claim 2, wherein said aliphatic polyol is contained in an amount of not less than 80 wt %.

7. An electrolyte according to claim 1, wherein said solvent consists essentially of the aliphatic polyol.

8. An electrolyte according to claim 7, wherein said aliphatic polyol is ethylene glycol.

9. An electrolyte according to claim 7, wherein said aliphatic polyol is 3-methoxy-1,2-propanediol.

10. An electrolyte according to claim 1, wherein said electrolyte contains water in amounts not larger than 2 wt %.

11. An electrolyte according to claim 1, wherein said quaternary ammonium salt is contained in an amount of from 1 to 50 wt %.

12. An electrolyte according to claim 11, wherein the amount range from 5 to 40 wt %.

13. An electrolyte according to claim 1, wherein the molar ratio of the dicarboxylic acid and the ammonium base is in the range of from 1:2.5 to 2:1.

14. An electrolyte for driving electrolytic capacitors which comprises a quaternary ammonium salt of glutaric acid dissolved in a solvent which comprises not less than 50 wt. % of an aliphatic polyol.

15. An electrolyte according to claim 14, wherein said solvent comprises not less than 50 wt % of the aliphatic polyol, based on the solvent.

16. An electrolyte according to claim 15, wherein said aliphatic polyol is ethylene glycol.

17. An electrolyte according to claim 15, wherein said aliphatic polyol is 3-methoxy-1,2-propanediol.

18. An electrolyte according to claim 15, wherein said aliphatic polyol is contained in an amount of not less than 70 wt %.

19. An electrolyte according to claim 18, wherein said aliphatic polyol is contained in an amount of not less than 80 wt %.

20. An electrolyte according to claim 14, wherein said solvent consists essentially of the aliphatic polyol.

21. An electrolyte according to claim 20, wherein said aliphatic polyol is ethylene glycol.

22. An electrolyte according to claim 20, wherein said aliphatic polyol is 3-methoxy-1,2-propanediol.

23. An electrolyte according to claim 14, wherein said electrolyte contains water in amounts not larger than 2 wt %.

24. An electrolyte according to claim 14, wherein said quaternary ammonium salt is contained in an amount of from 1 to 50 wt %.

25. An electrolyte according to claim 24, wherein the amount range from 5 to 40 wt %.

26. An electrolyte according to claim 14, wherein the molar ratio of the glutaric acid and the ammonium base is in the range of from 1:2.5 to 2:1.

27. An electrolytic capacitor which comprises an element having an anode electrode and a cathode electrode which are facing each other through a separator provided between the anode electrode and the cathode electrode, said separator being impregnated with an electrolyte which comprises at least one compound selected from the group consisting of quaternary ammonium salts of aliphatic saturated dicarboxylic acids having from 6 to 10 carbon atoms and dissolved in a solvent which comprises not less than 50 wt. % of an aliphatic polyol.

28. An electrolytic capacitor according to claim 27, wherein said solvent comprises not less than 50 wt % of the aliphatic polyol, based on the solvent.

29. An electrolytic capacitor according to claim 27, wherein said aliphatic polyol is ethylene glycol.

30. An electrolytic capacitor according to claim 27, wherein said aliphatic polyol is 3-methoxy-1,2-propanediol.

31. An electrolytic capacitor according to claim 27, wherein said solvent consists essentially of the aliphatic polyol.

32. An electrolytic capacitor according to claim 31, wherein said aliphatic polyol is ethylene glycol.

33. An electrolytic capacitor according to claim 32, wherein said aliphatic polyol is 3-methoxy-1,2-propanediol.

34. An electrolytic capacitor according to claim 27, wherein said electrolytic capacitor contains water in amounts not larger than 2 wt %.

35. An electrolytic capacitor according to claim 27, wherein said quaternary ammonium salt is contained in an amount of from 1 to 50 wt %.

36. An electrolytic capacitor according to claim 27, wherein the molar ratio of the dicarboxylic acid and the ammonium base is in the range of from 1:2.5 to 2:1.

37. An electrolytic capacitor which comprises an element having an anode electrode and a cathode electrode which are facing each other through a separator provided between the anode electrode and the cathode electrode, said separator being impregnated with an electrolyte which comprises a quaternary ammonium salt of glutaric acid dissolved in a solvent which comprises not less than 50 wt. % of an aliphatic polyol.

38. An electrolytic capacitor according to claim 37, wherein said solvent comprises not less than 50 wt % of the aliphatic polyol, based on the solvent.

39. An electrolytic capacitor according to claim 37, wherein said aliphatic polyol is ethylene glycol.

40. An electrolytic capacitor according to claim 37, wherein said aliphatic polyol is 3-methoxy-1,2-propanediol.

41. An electrolytic capacitor according to claim 37, wherein said solvent consists essentially of the aliphatic polyol.

42. An electrolytic capacitor according to claim 41, wherein said aliphatic polyol is ethylene glycol.

43. An electrolytic capacitor according to claim 42, wherein said aliphatic polyol is 3-methoxy-1,2-propanediol.

44. An electrolytic capacitor according to claim 37, wherein said electrolytic capacitor contains water in amounts not larger than 2 wt %.

45. An electrolytic capacitor according to claim 37, wherein said quaternary ammonium salt is contained in an amount of from 1 to 50 wt %.

46. An electrolytic capacitor according to claim 37, wherein the molar ratio of the dicarboxylic acid and the ammonium base is in the range of from 1:2.5 to 2:1.

* * * * *